United States Patent [19]

Ogasawara

[11] Patent Number: 4,494,561
[45] Date of Patent: Jan. 22, 1985

[54] CONDENSATE DISCHARGING APPARATUS
[75] Inventor: Yoshinari Ogasawara, Aichi, Japan
[73] Assignee: CKD Corporation, Komaki, Japan
[21] Appl. No.: 431,078
[22] Filed: Sep. 30, 1982
[30] Foreign Application Priority Data Nov. 25, 1981 [JP] Japan ................................ 56-188943

[51] Int. Cl.³ ............................................... F16T 1/00
[52] U.S. Cl. ................................................... 137/204
[58] Field of Search ................. 137/204, 203, 625.22, 137/625.65; 222/444

[56] References Cited

U.S. PATENT DOCUMENTS

| | | | |
|---|---|---|---|
| 2,111,007 | 3/1938 | Slobody | 222/444 X |
| 2,192,769 | 3/1940 | Dach | 137/204 |
| 2,619,106 | 11/1952 | Wilkerson . | |
| 2,619,985 | 12/1952 | Wilkerson . | |
| 2,636,571 | 4/1953 | Churchman . | |
| 2,662,551 | 12/1953 | Wilkerson . | |
| 2,677,386 | 5/1954 | Wilkerson . | |
| 2,812,860 | 11/1957 | Dilworth | 137/204 X |
| 2,816,564 | 12/1957 | Wilkerson . | |
| 2,819,799 | 1/1958 | Wilkerson . | |
| 2,869,570 | 1/1959 | Wilkerson . | |
| 3,402,529 | 9/1968 | Frantz | 137/204 X |
| 3,450,146 | 6/1969 | Edwards | 137/203 |
| 3,485,260 | 12/1969 | Hendrickson | 137/204 |
| 4,383,545 | 5/1983 | Becker | 137/204 |

Primary Examiner—Alan Cohan
Attorney, Agent, or Firm—Wenderoth, Lind & Ponack

[57] ABSTRACT

A condensate discharging apparatus has a housing formed therein with a condensate reservoir chamber and with an inlet port and an outlet port both communicated with said reservoir chamber through a valve chest, a rotary valve disposed rotatably within the valve chest and having a valve port for communicating the reservoir chamber alternatively with either the inlet port or the outlet port, and a motor for rotating the rotary valve. Within the condensate reservoir chamber, a tube is attached to the lower portion of a body of the housing for communicating between the valve chest and the lower portion of the drain reservoir chamber, so as to discharge the condensate in the lower portion of the reservoir chamber to the outside through the outlet port.

6 Claims, 9 Drawing Figures

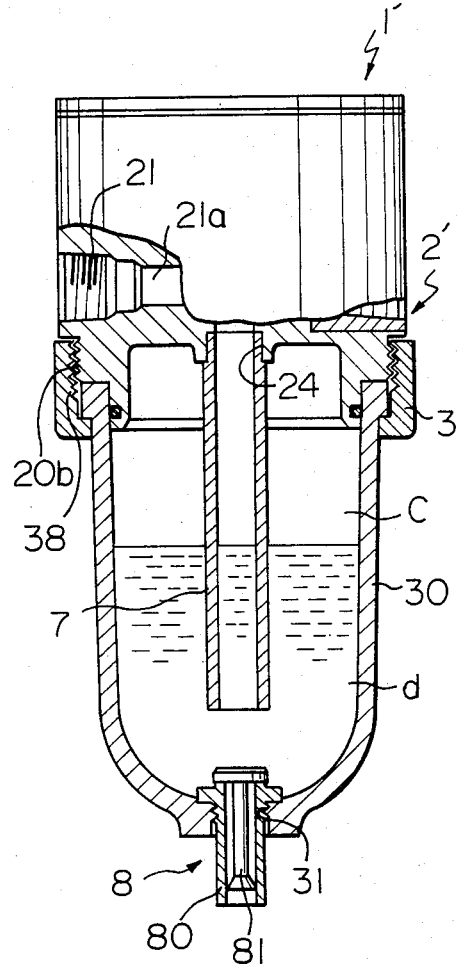
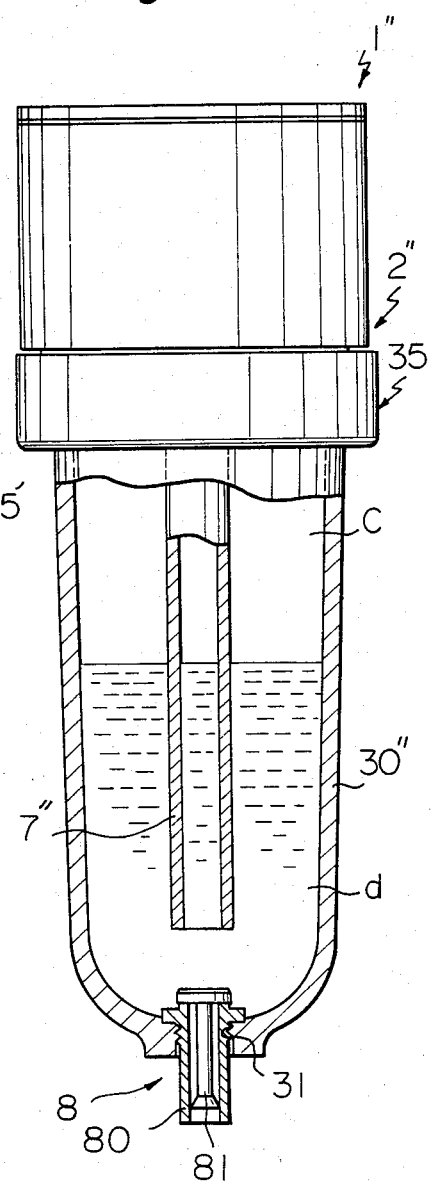

CONDENSATE DISCHARGING APPARATUS

BACKGROUND OF THE INVENTION

Conventional valves for automatically discharging condensate from compressed air systems which include the float type, the air pilot type, and the motor type, among which the motor type is the most reliable in discharging the condensate. The conventional condensate discharging apparatus of the motor type has a fixed or variable condensate discharging cycle or discharging period. In the fixed period type, the discharging period must be selected so that the largest probable quantity of the accumulated condensate will be discharged. Accordingly, in the winter season when the quantity of condensate is the smallest, the quantity of purge air becomes relatively large so that the air loss becomes unduly large and, in a small air pressure system, a drop in pressure is caused thereby.

In the variable type which is adjustable according to the quantity of the condensate produced, the discharging period is usually set somewhat longer so as to discharge the condensate surely and, accordingly, the apparatus has a complicated construction.

Further, absence of an indicator to check the operating condition of the apparatus from outside is a cause of inconvenience.

SUMMARY OF THE INVENTION

The present invention relates to a condensate discharging apparatus for discharging condensate in the form of water separated when air is compressed and collected in an air reservoir or pipes.

A principal object of the present invention is to provide a condensate discharging apparatus which causes only a small loss of compressed air and is easy to operate.

Another object of the present invention is to provide a condensate discharging apparatus in which a single discharging valve is rotated intermittently to communicate a condensate reservoir chamber alternately with an inlet port or an outlet port, to thereby discharge the condensate and/or the compressed air within the reservoir chamber.

In the discharging apparatus according to the present invention and having the construction in which the condensate reservoir chamber is communicated alternately with the inlet port and the outlet port to thereby discharge the condensate and/or only the volume of the compressed air collected in the condensate reservoir chamber, it is possible to minimize loss of the compressed air. Further, since air is not blown through from the inlet port to the outlet port even when the motor is stopped randomly, it is not necessary to control or ascertain the stopping position of the output shaft of the motor, which makes the operation very simple.

A further object of the present invention is to provide a condensate discharging apparatus, the discharging condition of which can be observed from the outside.

A still further object of the present invention is to provide a condensate discharging apparatus capable of charging freely the volume of the condensate reservoir chamber according to the size of the air pressure system.

BRIEF DESCRIPTION OF THE DRAWINGS

The invention will be better understood from the following description taken in connection with the accompanying drawings in which:

FIG. 6 is a view showing a modified form of the connector ring;

FIG. 7 is a view showing a larger vessel attached to a large body; and

DETAILED DESCRIPTION OF THE PREFERRED EMBODIMENTS

Figure 1:
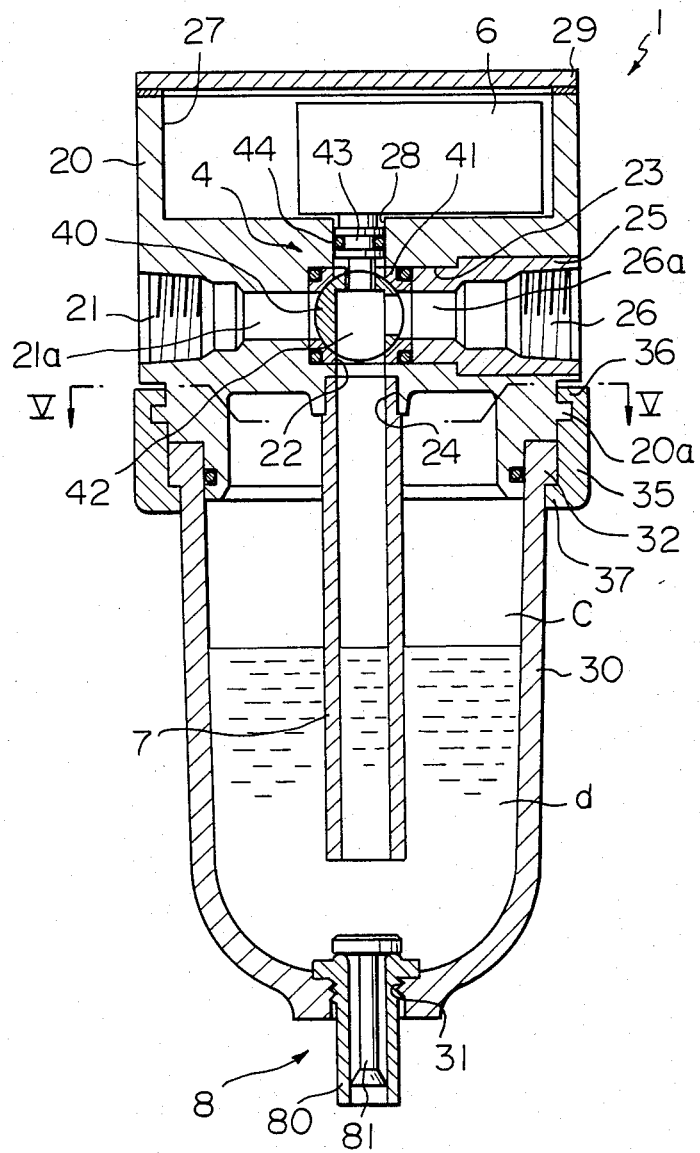
FIG. 1 is a vertical sectional view of an embodiment of the condensate discharging apparatus according to the present invention.
Figure 2:
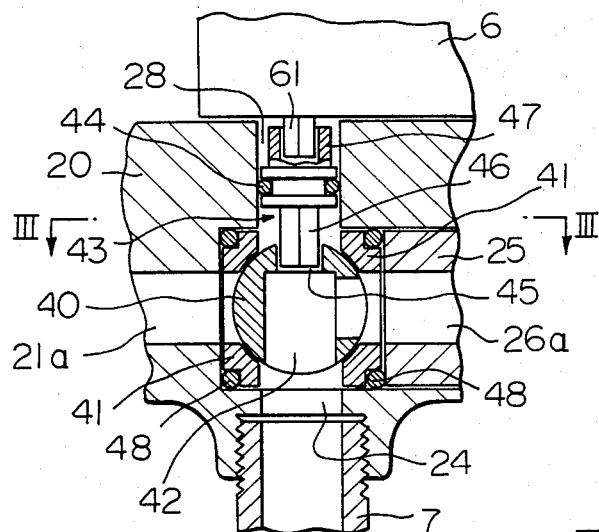
FIG. 2 is an enlarged view of a portion of FIG. 1, showing a rotary valve and a coupling in detail.

With reference now to the drawings, an embodiment of the condensate discharging apparatus according to the present invention will be described.

The embodiment of the condensate discharging apparatus 1 comprises mainly a housing 2, a condensate discharging valve or rotary valve 4 disposed within the housing 2, and a drive means or motor 6 for rotating the rotary valve.

The housing 2 comprises a body 20 and a preferably transparent vessel 30 which is disposed underneath the body 20 and removably attached to said body 20 by a connector ring 35 attached by a bayonet type joint to said body. The body 20 and the vessel 30 define a condensate reservoir chamber C.

The body 20 has therein an inlet port 21, a bore 23 constituting a valve chamber or chest 22, and a through hole 24 extending from the valve chest 22 downward through the body 20. The inlet port 21 is communicated with the valve chest 22 through a passage 21a. A stop member 25 for holding the rotary valve within the valve chest is fitted and fixed within the bore 23. The stop member 25 has therein an outlet port 26 and a passage 26a communicating the outlet port 26 with the valve chest 22.

A spherical valve body 40 of the rotary valve 4 is disposed rotatably within the valve chest 22. The valve body 40 is supported rotatably by a pair of spacer rings 41 disposed within the valve chest 22 and spaced from each other. The valve body 40 has therein a passage 42 having an end thereof communicated always with the through hole 24 and the other end thereof communicatable alternatively with the passage 21a or the passage 26a. A coupling 43 inserted rotatably within a bore 28 of the body is connected to the valve body 40 for rotation therewith.

Figure 4:
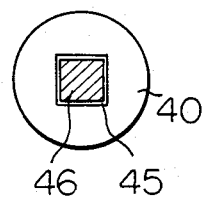
FIG. 4 is a view showing another form of the connection between the valve body and the coupling.
Figure 3:
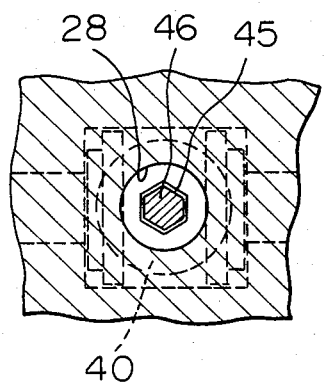
FIG. 3 is a sectional view taken along the line III—III of FIG. 2, showing a form of the connection between the valve body and the coupling.

As a means for connecting the valve body 40 and the coupling 43 together, a bore 45 of the valve body 40 is given a polygonal section (for example, hexagonal as shown in FIG. 3 or square as shown in FIG. 4) and the lower end 46 of the coupling 43 to be received within the bore 45 is given a corresponding polygonal section. The coupling 43 has at the upper end thereof a bore 47 having a polygonal section similar to that of the bore 45.

The means or motor 6 for rotating the valve body is mounted within a cavity 27 in the upper portion of the body and is fixed by known means such as set screws. A rotary shaft 61 of the motor 6 is given a polygonal section corresponding to the bore 47 of the coupling 43 and is inserted into said bore 47. Reference numeral 29 denotes a cover for the cavity 27, 44 denotes an O-ring seal for preventing leakage of fluid through the bore 28, and 48 denotes an O-ring seal disposed around the spacer ring 41.

A tube or pipe 7 is removably fitted into the through hole 24 of the body 20 and extends to the lower portion of the vessel 30.

A guide tube 80 is fixedly fitted into a bore 31 in the bottom of the vessel 30 and has a valve body 81 movably inserted thereinto. The guide tube 80 and the valve body 81 constitute a sludge valve 8 for manually discharging condensate d and sludge from the vessel 30.

Figure 5:
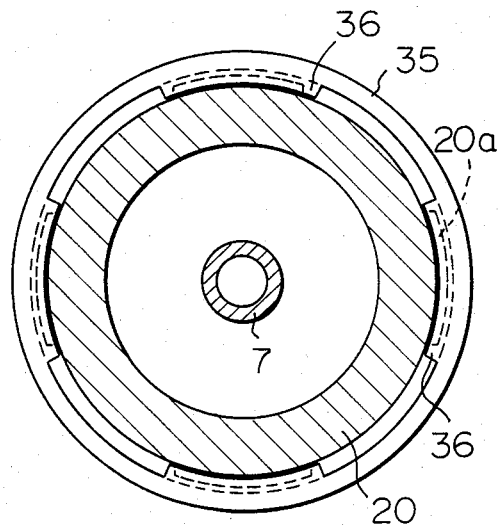
FIG. 5 is a sectional view taken along the line V—V of FIG. 1, showing a form of the connector ring.

The connector ring 35 is attached by a bayonet type joint to the body 20. On the outer periphery of the body 20, there is a plurality of slightly circumferentially inclined pawls 20a spaced equally circumferentially from one another as shown in FIG. 5, while on the inner periphery of the connector ring 35, there is a plurality of equally circumferentially spaced pawls 36 for engagement with the pawls 20a as shown in FIG. 5. The connector ring 35 is further provided with an inside flange 37 for engagement with a flange 32 on the upper end of the vessel 30. To fix the vessel 30 to the body 20, the connector ring 35 is fitted over the outside of the vessel 30, the connector ring 35 is fitted on the lower portion of the body 20 in such a manner that the pawls 36 do not hit the pawls 20a, and then the connector ring 35 is rotated so that the pawls 36 and 20a are brought into engagement with each other as shown in FIG. 1.

The connector ring 35 need not necessarily be a bayonet type as described above, but have the construction as shown in FIG. 6, in which a male thread 20b is provided on the outer periphery of the lower portion of the body 20 while a female thread 38 is provided on the inner periphery of the connector ring 35 for threadable engagement with the male thread 20b.

In the condensate discharging apparatus having the above-described construction, when the valve port 42 communicates the inlet port 21 and the through hole 24 with each other, the condensate collected in the air reservoir or in the pipes flows with air from the inlet port 21 through the valve port 42, the through hole 24 and the tube 7 into the drain reservoir chamber C within the vessel 30 and stays temporarily therein.

When the valve 40 is rotated by continuous rotation of the motor 6 to communicate the valve port 42 with the outlet port 26, the condensate collected in the condensate reservoir chamber C is pushed upward by the pressure of the compressed air collected in the reservoir chamber through the tube 7 and is discharged to the outside from the outlet port 26 through the valve port 42. The discharging of the condensate is stopped when the air pressure within the reservoir chamber is substantially equal to the atmospheric pressure.

When the valve port 42 is again communicated with the inlet port 21 by rotation of the motor, condensate and compressed air are again collected in the reservoir chamber as described above.

Solid foreign matter, such as sludge, collects in the bottom of the reservoir chamber and can be discharged by manually operating the valve body 81 of the sludge valve 8.

In the case where a large quantity of condensate is collected as in a rainy or humid season, a larger vessel 30″ may be used as shown in FIG. 7.

In the above-described embodiment, while the valve body of the discharging valve for switching the communication of the tube with the inlet port and the outlet port has been described and illustrated as being a spherical valve, it may have another construction, for example, a cylindrical valve body.

Figure 8:
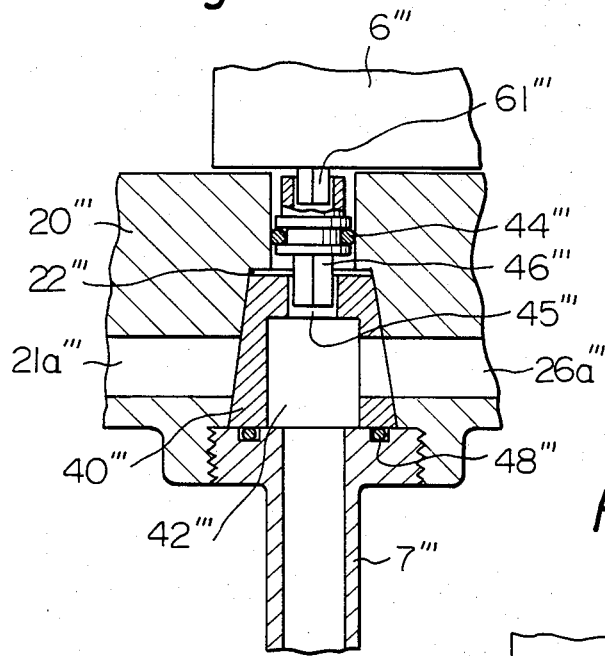
FIGS. 8 and 9 are sectional views of other embodiments of the drain discharging apparatus according to the present invention, showing modifications of the rotary valve.

FIG. 8 shows another embodiment of the present embodiment of the present invention incorporating a modification of the rotary valve. In the condensate discharging apparatus of this embodiment, a body 20‴ has therein a frustoconical bore which constitutes a valve chest 22‴ and diverges downwardly of the body 20‴. This bore is communicated with an inlet port through a passage 21a‴ and with an outlet port through a passage 26a‴. A valve body 40‴ having a frustoconical outer periphery is inserted rotatably into the bore or valve chest 22‴ and is held in position by a tube or pipe 7‴ threadably engaged with a lower open end of the valve chest. An O-ring seal 48‴ in engagement with the lower end face of the valve body 20‴ is disposed within an annular groove formed on the upper end face of the tube 7‴. The valve body 40‴ has therein a passage 42‴ for communicating between the passage 21a‴ or 26a‴ and the inside of the tube 7‴. The passage 26a‴ is formed directly in the body 20‴. In all other structural features and operation, the embodiment of FIG. 8 is identical to the condensate discharging apparatus shown in FIGS. 1 to 5.

Figure 9:
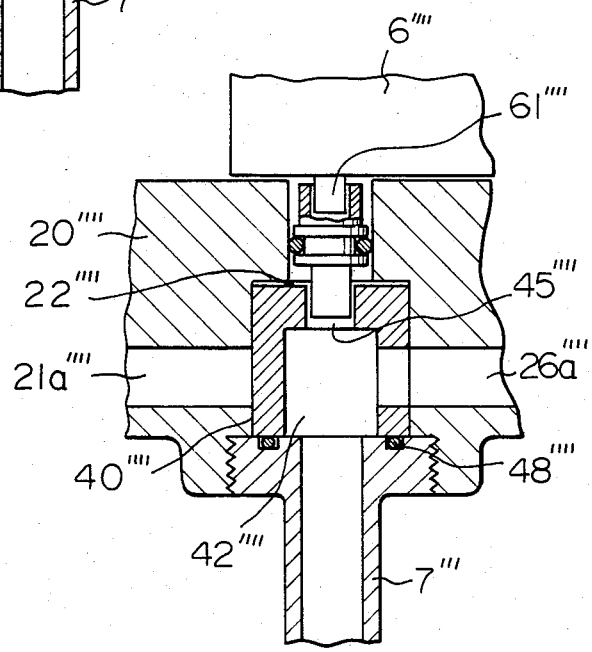

The bore constituting the valve chest may be cylindrical in shape and, as shown in FIG. 9, a cylindrical valve body 40‴ may be inserted rotatably into the cylindrical bore or valve chest 22⁗.

What is claimed is:

1. A drain discharging apparatus for connection to a place in which condensate in compressed air accumulates, such as the bottom of a compressed air tank, an air conduit or the like, said apparatus comprising:

a housing having a body therein with an inlet port for connection to said place, an outlet port and a valve chest therein, and having a motor chamber in the upper part thereof;

a vessel;

a connector ring removably attaching said vessel to the lower portion of said body, said body and said vessel together defining a condensate reservoir chamber and said valve chest opening into said reservoir chamber;

a rotary valve in said valve chest and including a valve body having a valve passage therethrough for communicating said reservoir chamber only with said inlet port in one rotational position of said valve body and communicating said reservoir chamber only with said outlet port in another rotational position of said valve body and blocking communication between said ports and said reservoir chamber in all further rotational positions thereof;

an electric motor positioned in said motor chamber and connected to said valve body for continuously rotating said valve body around the axis thereof; and a tube attached to the lower portion of said housing around said opening of said valve chest and within said reservoir chamber and extending between said valve chest and the lower portion of said reservoir chamber for conducting condensate collected in the lower portion of said reservoir chamber to said valve chest, whereby said rotary valve connects said reservoir chamber with said inlet port and to said outlet port alternately while not connecting said inlet and outlet ports to each other simultaneously, and the condensate accumulated in said place is introduced into said reservoir chamber while said valve port communicates said reservoir chamber with said inlet port and is discharged from said reservoir chamber by the pressure accumulated therein only when said valve port communicates said reservoir chamber with said outlet port.

2. An apparatus according to claim 1 in which said connector ring and said body have a bayonet type joint connecting them.

3. An apparatus according to claim 1 in which the outer periphery of the lower portion of said body has a male thread theeon and the inner periphery of said connector ring has a female thread thereon threadely engaged with the male thread on said body.

4. An apparatus according to any of claims 1 to 3 further comprising a pair of spacers in said valve chest and said rotary valve being a spherical valve body rotatably held between said spacers, and a stop tightly engaged with said body and holding said spacers and said valve body within said valve chest.

5. An apparatus according to any of claims 1 to 3 in which said valve chest is cylindrically shaped and said valve body of said rotary valve is cylindrical in shape and rotatably positioned in said valve chest.

6. An apparatus according to any of claims 1 to 3 in which said valve chest is frustoconical in shape and said valve body of said rotary valve is frustoconical in shape and rotatably positioned in said valve chest.

* * * * *